United States Patent
Antila et al.

(10) Patent No.: US 6,259,784 B1
(45) Date of Patent: Jul. 10, 2001

(54) PROCEDURE FOR PROVIDING A PSTM-MAPPING IN A TELECOMMUNICATION SYSTEM

(75) Inventors: Leena Antila; Timo Juntunen; Toivo Lallukka; Olli Liinamaa; Pekka Lehto; Jyrki Suutari, all of Oulu (FI)

(73) Assignee: Nokia Networks Oy, Espoo (FI)

(*) Notice: Subject to any disclaimer, the term of this patent is extended or adjusted under 35 U.S.C. 154(b) by 0 days.

(21) Appl. No.: 09/551,631

(22) Filed: Apr. 18, 2000

Related U.S. Application Data

(63) Continuation of application No. PCT/FI98/00844, filed on Oct. 29, 1998.

(30) Foreign Application Priority Data

Oct. 29, 1997 (FI) .......................................... 974089

(51) Int. Cl.$^7$ ...................................................... H04N 7/00
(52) U.S. Cl. ........................... 379/229; 379/207; 379/220
(58) Field of Search ...................................... 379/219, 220, 379/221, 229, 207, 201

(56) References Cited

FOREIGN PATENT DOCUMENTS

| 297 04 615 U1 | 6/1997 | (DE) . |
|---|---|---|
| 0 583 137 | 2/1994 | (EP) . |
| 0 731 618 | 9/1996 | (EP) . |
| 0 734 186 | 9/1996 | (EP) . |
| 973313 | 3/1997 | (FI) . |
| 93/18598 | 9/1993 | (WO) . |
| 96/34504 | 10/1996 | (WO) . |
| 97/16936 | 5/1997 | (WO) . |
| WO 99/08455 * | 2/1999 | (WO) . |

OTHER PUBLICATIONS

ETS 300 347–1 Signalling Protocols and Switching (SPS); V interfaces at the digital Local Exchange (LE) V5.2 interface for the support of Access Network (AN) Part 1: V5.2 interface specification, Sep. 1994.
ETS 300 324–1 Signalling Protocols and Switching (SPS); V interfaces at the digital Local Exchange (LE) V5.1 interface for the support of Access Network (AN) Part 1: V5.1 interface specification, Feb. 1994.

* cited by examiner

Primary Examiner—Creighton Smith
(74) Attorney, Agent, or Firm—Altera Law Group, LLC

(57) ABSTRACT

Procedure for accomplishing PSTN-mapping in a telecommunication system comprising a telephone exchange (LE) with a number of subscribers defined in it, a first access node (AN1), which is connected to the telephone exchange via a first V5 interface (V5), a second access node (AN2), which is connected to the first access node (AN1) via a second V5 interface (V5'), and terminal equipment (TE) connected to the second access node (AN2), the connection between the subscriber and the telephone exchange (LE) being set up by cascading the two V5 interfaces. The signalling sequences and message decoding in PSTN-mapping are exclusively taken care of by the telephone exchange (LE) and the second access node (AN2), and the signalling is transmitted transparently through the first access node (AN1) without the first access node participating in the decoding of the signalling.

4 Claims, 1 Drawing Sheet

PROCEDURE FOR PROVIDING A PSTM-MAPPING IN A TELECOMMUNICATION SYSTEM

Figure 1:
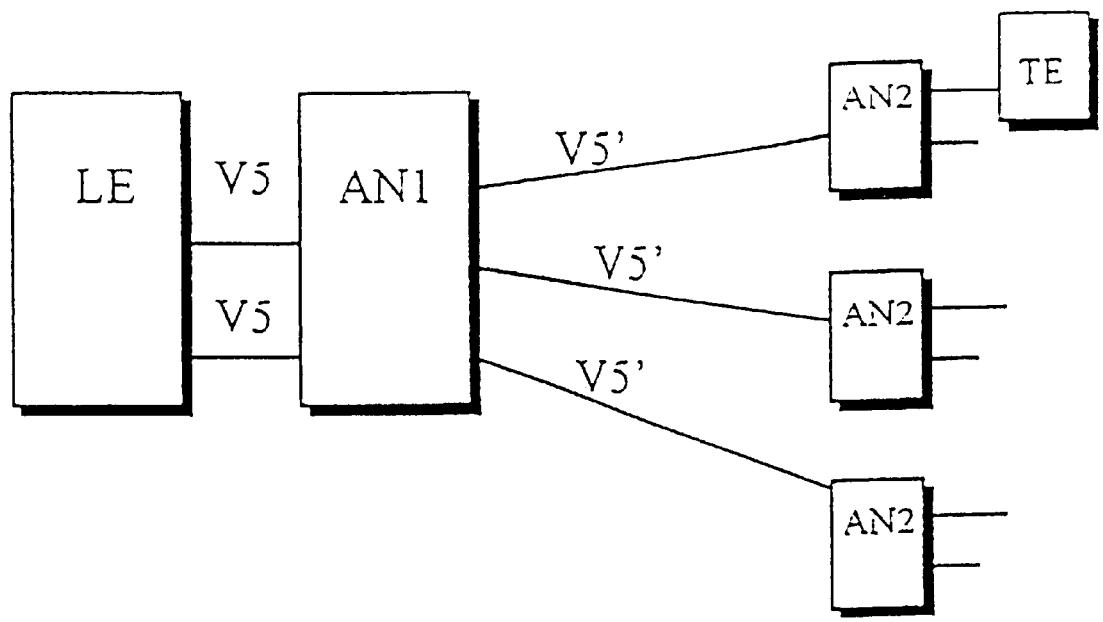

This application is a continuation of PCT/FI98/00844 filed Oct. 29, 1998.

The present invention relates to a procedure as defined in the preamble of claim 1.

An earlier application, FI-973313, by the same applicant presents a telecommunication system that uses a so-called cascaded V5 interface. A number of subscribers are defined in a telephone exchange. A first access node is connected to the telephone exchange via a first V5 interface. A second access node is connected to the first access node via a second V5 interface. A subscriber terminal is connected to the second access node. Thus the connection between the subscriber and the telephone exchange is set up by cascading the two V5 interfaces.

V5 interfaces are defined by the ETS 300 324 and 300 347 standards. A dynamic V5.2 concentrator interface as defined in the ETS 300 347 standard series consists of one or more (1–16) PCM (Pulse Code Modulation) lines. One PCM line comprises 32 time slots or channels, each of which with a transfer rate of 64 kbit/s, i.e. 2048 kbit/s altogether. However, the standard is not exclusively concerned with 2 Mbit/s connections. 1.5 Mbit/s connections are used in the USA, and ITU versions of the V5 standards allow 1.5 Mbit/s connections. The V5.2 interface supports analogue telephones as used in the public telephone network, digital, such as ISDN (Integrated Services Digital Network) basic and system subscriber lines as well as other analogue or digital terminal equipment based on semi-fixed connections.

A static V5.1 multiplexer interface consistent with the ETS 300 324 series consists of one 2048 kbit/s PCM line. The V5.1 interface supports the same subscriber types as the V5.2interface except ISDN system lines.

PSTN signalling in a V5 interface always requires national and/or of operator-specific adaptation (so-called PSTN mapping) because of national and/or operator-specific differences in the signalling. Typically, this adaptation includes definitions of the PSTN messages to be used, the encoding of information elements, and ways of using different messages in different signal currents.

In a cascaded V5 interface, the problem is how to accomplish PSTN mapping when the subscriber lines are connected to physically separate access nodes so that an access node through which signalling is transmitted does not necessarily know the properties and limitations of the other access nodes.

The object of the present invention is to eliminate the drawbacks described above.

A specific object of the present invention is to disclose a procedure that enables PSTN mapping to be accomplished without problems in a cascaded V5 interface.

The procedure of the invention is characterised by what is presented in claim 1.

According to the invention, in a cascaded V5 interface, the signalling sequences and decoding of messages in PSTN mapping are only performed in the telephone exchange and a second access node. The signalling is transmitted transparently via a first access node without the first access node participating in the decoding of the signalling.

The invention has the advantage of simplifying the accomplishment of PSTN mapping in a cascaded V5 interface.

In an embodiment of the procedure, the required routing data in the messages to be transmitted are changed in the first access node.

In an embodiment of the procedure, the second access node is a multiplexer.

In an embodiment of the procedure, the first V5 interface is a V5.2 interface consistent with the ETS 300 347 standard and the second V5 interface is a V5.1 interface consistent with the ETS 300 324 standard.

Figure 2:
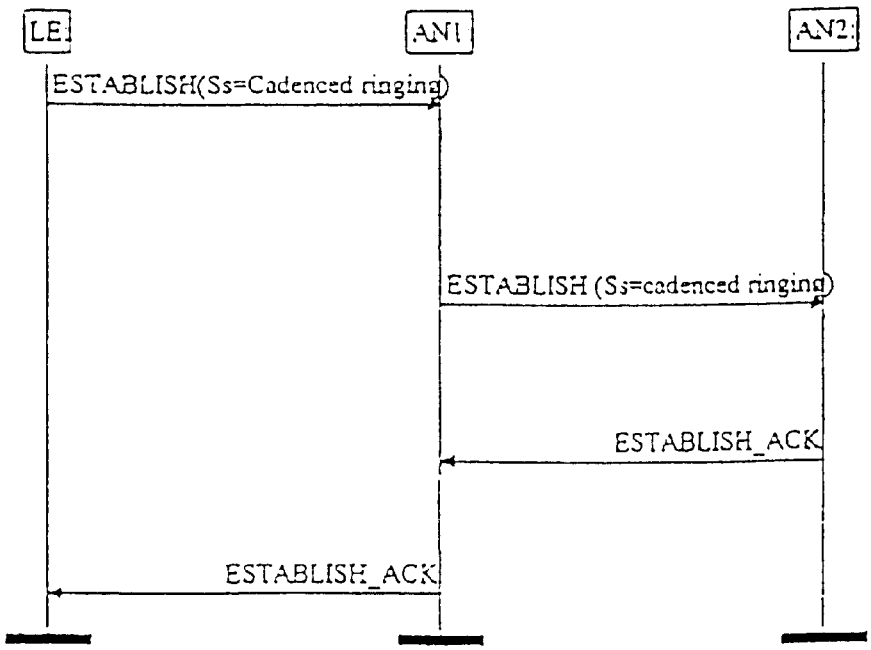

In the following, the invention will be described in detail by the aid of a few examples of its embodiments by referring to the attached drawing, wherein FIG. 1 is a diagram representing a preferred telecommunication system with regard to the present invention, and FIG. 2 presents a signalling diagram according to the procedure of the invention in conjunction with the set-up of a terminating call.

The diagram in FIG. 1 presents a telecommunication system comprising a telephone exchange LE with a number of subscribers defined in it. A first access node AN1 is connected to the telephone exchange LE via a first V5 interface V5, which is a V5.2 interface consistent with the ETS 300 347 standard. A second access node AN2 is connected to the first access node AN1 via a second V5 interface V5', which is V5.1 interface consistent with the ETS 300 324 standard. Subscriber terminals TE are connected to the second access node AN2, which is a multiplexer. The connection between the subscriber TE and the telephone exchange LE is thus set up by cascading the two V5 interfaces. The signalling sequences and decoding of messages in PSTN mapping are taken care of by the telephone exchange LE and the multiplexer AN2, which means that the first access node AN1, through which the signalling is transmitted, does not decode the signalling but only changes the required routing data in the messages to be transmitted. Thus, the signalling is transmitted transparently through the first access node AN1.

FIG. 2 shows an example of a signalling diagram in the set-up of a terminating call, which, expressed in more precise terms according to the Finnish national mapping, is "B-side seizure until ring tone applied". At first, the local exchange LE sends an ESTABLISH (Ss=Cadenced ringing) message (Ss=steady signal) to the first access node AN1, which does not decode it but changes the V5.2 interface and subscriber identification data so as to adapt them to the V5.1 interface and sends the message further into the V5.1 interface. The first access node AN1 does not perform the function required by PSTN mapping. The ESTABLISH (Ss=Cadenced ringing) message, provided with changed identification data, is forwarded to the second access node AN2. In accordance with the V5 standard, AN2 acknowledges the message by returning an ESTABLISH_ACK message, in which the identification data are replaced in the first access node AN1 with data adapted to the V5.2 interface, without AN1 decoding the message. From the first access node AN1, the ESTABLISH_ACK message is transmitted further to the local exchange LE.

The invention is not restricted to the examples of its embodiments described above, but many variations are possible within the scope of the inventive idea defined by the claims.

What is claimed is:

1. Procedure for accomplishing PSTN mapping in a telecommunication system comprising a telephone exchange (LE) with a number of subscribers defined in it, a first access rode (AN1), which is connected to the telephone exchange via a first V5 interface (V5), a second access node (AN2), which is connected to the first access node (AN1) via a second V5 interface (V5'), and terminal equipment (TE) connected to the second access node (AN2), the connection between the subscriber and the telephone exchange (LE) being set up by cascading the two V5 interfaces, characterised in that the signalling sequences and decoding of messages in PSTN mapping are exclusively taken care of by the telephone exchange (LE) and the second access node (AN2), and the signalling is transmitted transparently through the first access node (AN1) without the first access node participating in the decoding of the signalling.

2. Procedure as defined in claim 1, characterised in that the routing data in the messages to be transmitted are changed as required in the first access node (AN1).

3. Procedure as defined in claim 1 characterised in that the second access node (AN2) is a multiplexer.

4. Procedure as defined in claim 1, characterised in that the first V5 interface (V5) is a V5.2 interface consistent with the ETS 300 347 standard and the second V5 interface (V5') is a V5.1 interface consistent with the ETS 300 324 standard.

* * * * *